Dec. 6, 1960   B. L. HINKLE ET AL   2,962,766
PROCESS OF PRODUCING CELLULOSE FILM USING
A FLOWING COAGULATING BATH
Filed Oct. 11, 1957   2 Sheets-Sheet 1
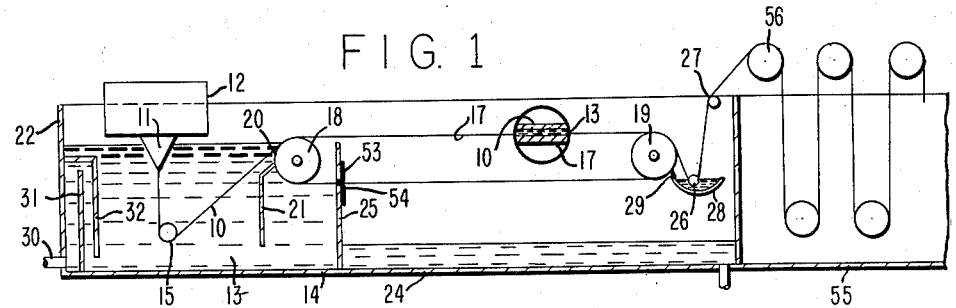
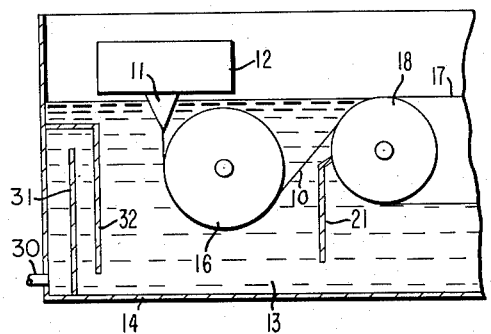
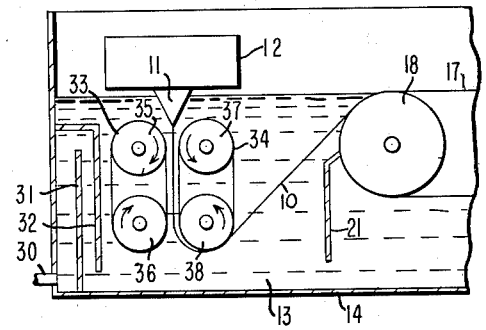
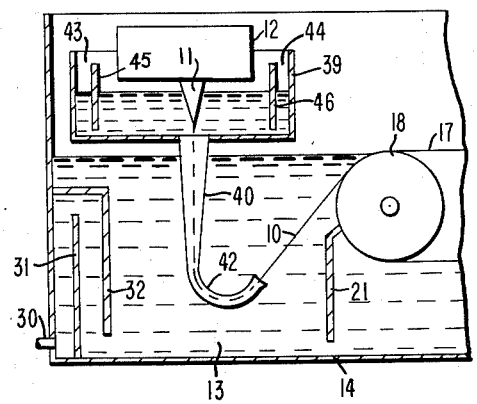
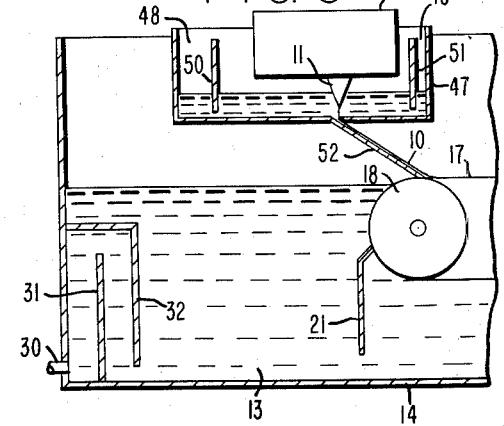
INVENTORS
BARTON LESLIE HINKLE
FREDERICK CHARLES STULTS
BY
ATTORNEY

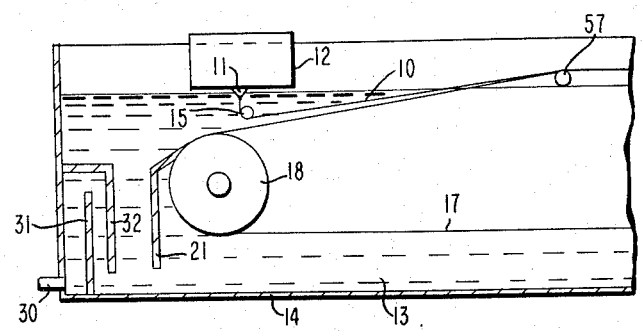
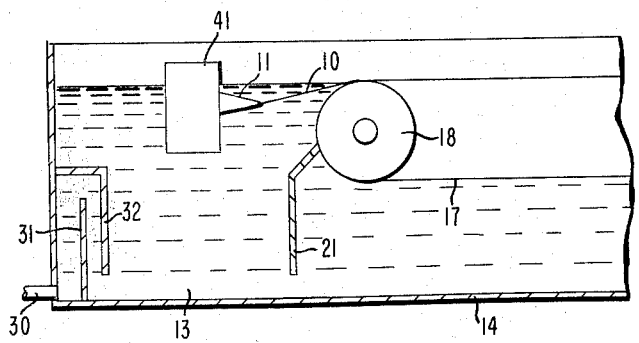
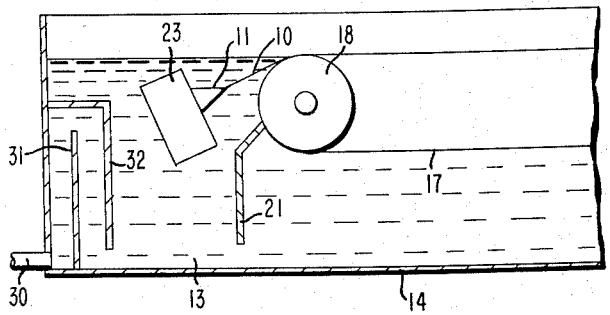

United States Patent Office 2,962,766
Patented Dec. 6, 1960

2,962,766

PROCESS OF PRODUCING CELLULOSE FILM USING A FLOWING COAGULATING BATH

Barton Leslie Hinkle, Richmond, Va., and Frederick Charles Stults, Columbia, Tenn., assignors to E. I. du Pont de Nemours and Company, Wilmington, Del., a corporation of Delaware Filed Oct. 11, 1957, Ser. No. 689,735

5 Claims. (Cl. 18—57)

This invention relates to the casting of regenerated cellulose film and has as its objects a process for casting film at relatively high velocities (as high as 200 yards per minute and higher) without adversely affecting the properties of the film. Other objects will appear hereinafter.

The process of the invention comprises extruding viscose into a bath containing coagulating liquid to form a gel film, conveying coagulating liquid on a moving endless belt, continuously drawing the freshly-extruded gel film over and in contact with the liquid on the endless belt to substantially complete coagulation of the gel film. Preferably, the gel film moves at a higher velocity than the liquid on the belt in contact with the film.

In practice, the coagulating liquid on the moving endless belt is removed by the belt from the main body of coagulating liquid, the belt be'r : disposed and adapted to withdraw only enough liqu: to substantially complete coagulation of the gel film while the film is in contact with liquid on the belt.

Apparatus used for carrying out the invention comprises, in addition to the conventional means for extruding a film from a dispersion of a coagulable cellulosic material from which cellulose may be regenerated (viscose) and a vessel containing a liquid coagulant (an acid-sulfate bath) positioned to receive the extruded film, an endless belt disposed to convey liquid coagulant on the belt and means independent of the belt to draw the film over and in contact with the liquid on the belt to complete coagulation of the film.

The invention will be more clearly understood by referring to the following detailed description in conjunction with the accompanying drawings, in which:

Figure 1 is a sectional diagrammatic side elevation of one embodiment of the invention;

Figure 2 is a cut-away portion of a sectional diagrammatic side elevation of a second embodiment of the invention; and Figures 3, 4, 5, 6, 7 and 8 are cut-away portions of sectional diagrammatic side elevations of other embodiments of the invention.

In Figures 1 and 2 the viscose solution, which may contain from 4–15% cellulose and 4–15% sodium hydroxide, is extruded downwardly in the form of a sheet of gel film 10 through the lips 11 of hopper 12 into the coagulating liquid 13 disposed in section 22 of tank 14. The liquid is usually an acid-sulfate bath comprising from 4–15% sulfuric acid and from 5–20% sodium sulfate. Section 22 of the tank is separated from section 24 by a wall 25. The wall is slotted; squeegees 53 and 54, attached to the walls adjacent to the slot, clean the endless belt 17 of any spent bath solution prior to the entry of the belt into section 22.

After passing under the stationary rod 15 as shown in Figure 1 or the drum 16 as shown in Figure 2, the film is led onto the endless moving belt 17. The endless belt must be at least as wide as the film and should be constructed of a suitable, flexible, non-corrosive material. A preferred material is a neoprene-covered fabric approximately one-quarter of an inch thick. The belt 17 is fitted around rolls 18 and 19, which rolls are driven by a variable speed drive not shown.

The belt is placed so that it passes through a section of the bath at 20, during which passage the belt picks up bath liquid. A squeegee-type baffle 21 serves to adjust the amount of liquid on the belt before its arrival in section 20 and to minimize any turbulence that might be caused by the pumping action of the belt. The level of the bath in tank 14 is preferably about one inch below the top section of the belt 17. However, the height of the bath in tank 14 is adjustable and may vary anywhere from slightly above the three inches below the level of the belt. The important consideration is that the bath level be adjusted so that the belt will remove only enough coagulating liquid from the bath to substantially complete coagulation of the film and partially regenerate the cellulosic film by the time the film arrives at tank 55. Thereafter, regeneration of the cellulosic film is completed; the film is washed, desulfured, bleached and softened in the conventional manner. At least the first roll 56 above the first tank 55 is a power-driven roll. The driving source is not shown but may be a conventional variable speed motor. In this way, the film is drawn over the liquid on the endless belt 17 independently of the speed of the belt and the liquid thereon.

Before passing to tank 55, the film passes under rod 26 and over rod 27. Rod 26 is partially submerged in Trough 28 placed between the walls of tank 14. Liquid for trough 28 is obtained by means of scraper 29 which contacts the surface of the moving belt 17. Excess liquid is permitted to overflow from trough 28 into section 24 of tank 14. The spent liquid is then removed from the bottom of the tank and replenished in a separate operation not shown and fed into tank 14 through a conduit at 30. Baffles 31 and 32 disposed in tank 14 serve to minimize the turbulence that might be caused by the flow of incoming bath liquid.

At a film speed of 200 yards per minute, the process of the invention, utilizing the so-called moving flume, was able to produce substantial improvements over a process in which a stationary flume is used. Film widths were increased an average of 15% and impact strengths were improved over 30%. In short, most of the loss in physical properties which might be expected when increasing casting speeds to about 200 yards per minute is recovered by substituting the moving flume for a stationary flume.

For optimum results, it has been found that the endless moving belt and, hence, the bath thereon, should move at a lower rate than the moving gel film, preferably about 80% of the rate of the film. However, it has been found that the invention is operable when the belt velocity is from 80% to 125% of the film speed.

Even greater improvements are obtainable by further limiting bath turbulence in the region of film extrusion or by limiting the distance through which the film must pass before the film reaches the moving belt. Some of these innovations are shown in Figures 3–8 in combination with the endless moving belt of the present invention. It should be understood, however, that the process and apparatus essential to the present invention are as described for Figures 1 and 2.

Figure 3 is an illustration of one method of protecting the freshly-extruded film in its course to the moving flume. Viscose is extruded downwardly through the lips 11 of hopper 12 between the two moving belts 33 and 34 which are fitted around rolls 35 and 36 and rolls 37 and 38 respectively. The rolls are rotated in the directions indicated on Figure 3 at approximately the same surface speed as the endless belt 17. The film may be led around the roll 38 as shown or a rod may be placed below and between the two belts around which the film may be led. The film is then led to the belt 17 and is treated in the manner described previously. The dual belt method of protecting freshly-extruded viscose film is the subject of co-pending U.S. application Serial No. 689,523, filed October 11, 1957, assigned to the assignee of the present application.

Figure 4 illustrates another method of protecting the freshly-extruded film by minimizing bath turbulence. A small tank 39 is attached to the walls of tank 14. The bottom of tank 39 is open and formed into a J-shaped duct 40. The duct is designed to provide a gradual acceleration of bath velocity from nearly zero at the lips 11 of the hopper 12 to a maximum velocity at the throat 42 of the duct. Besides introducing bath at 30 as in Figures 1–3, bath is also introduced into two reservoirs 43 and 44 in tank 39 and made to flow under baffles 45 and 46 to dissipate turbulence near the point of extrusion. The rate of bath flow through duct 40 depends on the difference between the height of the liquid maintained in tank 39 and the liquid level maintained in the lower tank 14. The gel film, after being partially coagulated and regenerated in the duct 40, is led to the belt 17 and is treated in the manner described previously. The J-shaped duct for protecting the freshly-extruded viscose is the subject of co-pending U.S. application, Serial No. 689,529, filed October 11, 1957, assigned to the assignee of the present application.

Figure 5 illustrates a method of extending the protection offered by the moving flume to the traveling film. This method comprises a "declined" flume and is the subject of U.S. application, Serial No. 689,522, filed October 11, 1957, assigned to the assignee of the present application. In this method an open-bottom tank 47 similar to that shown in Figure 4 is disposed above tank 14. Bath is introduced into the reservoirs 48 and 49 and baffles 50 and 51 serve to dissipate some of the turbulence caused by the entry of the bath. The open bottom of tank 47 is adapted to form an inclined surface 52 over which the bath and the freshly extruded film travel at approximately the same rate. The tension on the film is minimized by selecting the appropriate slant and slot opening at the top of the surface 52. The gel film, after being partially coagulated and regenerated while traveling on the surface 52, is led to the moving endless belt 17 where coagulation is completed and the film is treated as described previously. It will be noted that surface 52 does not extend to the belt 17 but stops just short of the belt. This permits spent liquid to drop into the tank 14 and to permit the gel film to be in contact with only the bath liquid carried by the belt 17.

Figure 6 illustrates a slightly modified moving flume which reduces the distance through which the freshly-extruded gel film must travel before contacting the liquid on the moving endless belt. The leading end of the endless moving belt 17 is extended by placing the roll 18 below and to the left of rod 15. Thus, the film is extruded directly over the endless belt and is permitted to gradually come in contact with the liquid on the belt. A guide roll 57, inserted near the surface of the bath liquid 13 in tank 14, serves to adjust the slope of the endless belt so that it proceeds in a horizontal direction to the roll 19. In all other respects, the equipment and the manner of operation is identical to that described for Figure 1.

Figures 7 and 8 also illustrate methods that tend to limit the distance through which the film must pass before reaching the moving endless belt 17. However, they involve horizontal casting. Figure 7 illustrates a horizontal hopper 41 that is partially submerged. It is also possible to move the hopper outside tank 14 with the lips of the hopper protruding through a narrow slit in the wall of the tank. Figure 8 illustrates a submerged hopper 23 canted at an angle of approximately 30° to avoid restricting bath flow to the upper surface of the film. These horizontal methods in combination with the moving flume of the present invention permit high speed casting.

While the invention has been described for the casting of viscose into an acid-sulfate bath to form regenerated cellulose film, the invention is applicable to any system wherein a film may be produced from a coagulable film-forming dispersion or solution by extrusion into a solution of a chemical coagulant. In the case of cellulose, the invention is applicable to the extrusion of viscose, cuprammonium solution or solutions of cellulose in inorganic salts, inorganic acids and organic solvents into known chemical coagulants.

Having fully disclosed the invention, what is claimed is:

1. In a process for preparing regenerated cellulose film wherein viscose is extruded into an acid-sulfate bath to form a gel film and the gel film is subsequently regenerated and washed free from impurities, the improvement which comprises conveying a thin layer of acid-sulfate liquid on a moving endless belt and continuously drawing the freshly-extruded gel film independent of the speed of the moving endless belt over and in contact with said layer of liquid on said belt, the liquid in contact with said gel film being only enough to substantially complete coagulation of the gel film in contact therewith.

2. A process as in claim 1 wherein the liquid on said belt is conveyed at a rate that is equal to 80% of the rate at which said film is drawn.

3. In a process for preparing regenerated cellulose film wherein viscose is extruded into an acid-sulfate bath to form a gel film and the gel film is subsequently regenerated and washed free from impurities, the improvement which comprises removing liquid from said bath and conveying said liquid as a thin layer on a moving endless belt and continuously drawing the freshly-extruded gel film independent of the speed of the moving endless belt over and in contact with said layer of liquid on said belt, the liquid in contact with said gel film being only enough to substantially complete coagulation of the gel film in contact therewith.

4. In a process for preparing regenerated cellulose film wherein viscose is extruded into an acid-sulfate bath to form a gel film and the gel film is subsequently regenerated and washed free from impurities, the improvement which comprises conveying a thin layer of acid-sulfate liquid on a moving endless belt and continuously drawing the freshly-extruded gel film independent of the speed of the moving endless belt over and in contact with said layer of liquid on said belt, the liquid in contact with said gel film being only enough to substantially complete coagulation of the gel film in contact therewith, the speed of the moving endless belt being lower than the speed of drawing the film.

5. In a process for preparing regenerated cellulose film wherein viscose is extruded into an acid-sulfate bath to form a gel film and the gel film is subsequently regenerated and washed free from impurities, the improvement which comprises conveying a thin layer of acid-sulfate liquid on a moving endless belt and continuously drawing the freshly-extruded gel film independent of the speed of the moving endless belt over and in contact with said layer of liquid on said belt, the liquid in contact with said gel film being only enough to substantially complete coagulation of the gel film in contact therewith, the speed of the moving endless belt being from 80% to 125% of the speed of drawing the film.

References Cited in the file of this patent

UNITED STATES PATENTS

| | | |
|---|---|---|
| 1,153,004 | Althouse | Sept. 7, 1915 |
| 1,837,854 | Esselen | Dec. 22, 1931 |
| 2,037,292 | Weihe | Apr. 14, 1936 |
| 2,319,305 | De Nooij et al. | May 18, 1943 |
| 2,534,629 | Schultze | Dec. 19, 1950 |

FOREIGN PATENTS

| | | |
|---|---|---|
| 547,618 | Germany | May 10, 1932 |

UNITED STATES PATENT OFFICE
CERTIFICATION OF CORRECTION

Patent No. 2,962,766            December 6, 1960

Barton Leslie Hinkle et al.

It is hereby certified that error appears in the above numbered patent requiring correction and that the said Letters Patent should read as corrected below.

Column 2, line 23, for "the", first occurrence, read -- to --.

Signed and sealed this 6th day of June 1961.

(SEAL)
Attest:

ERNEST W. SWIDER
Attesting Officer

DAVID L. LADD
Commissioner of Patent